FIG. 1

INVENTORS
EDWARD L. HOLCOMBE
ORVILLE M. CALVERT
WILLIAM M. KESSEL
BY Edward J Hanson Jr
ATTORNEY

3,714,754
VACUUMIZING SYSTEM
Edward L. Holcombe, Taylor, and Orville M. Calvert, Spartanburg, S.C., and William M. Kessel, Wernersville, Pa., assignors to W. R. Grace & Co., Duncan, S.C.
Filed Dec. 14, 1970, Ser. No. 97,703
Int. Cl. B65b *31/02*
U.S. Cl. 53—22 B
9 Claims

ABSTRACT OF THE DISCLOSURE

Disclosed is an apparatus and method for vacuum packaging products in containers such as bags. The vacuumizing apparatus includes a vacuum chamber and a vacuum extractor operating independently on the container within the vacuum chamber. In preferred embodiments, the apparatus includes a conveyor for transporting the bagged products and a hood member which, when contacting the conveyor, forms a vacuumizing chamber therewith and the hood member contains means for closing the bag after vacuumizing.

BACKGROUND OF THE INVENTION

The present invention relates to a method and means for vacuumizing containers and particularly bagged products. More particularly, the invention relates to a vacuumizing system for first vacuumizing an area around the container and subsequently the container itself independently.

A primary object of the present invention is to provide a system for optimising the completeness of evacuation in vacuumizing containers, particularly bags.

An additional object of the present invention is to provide a vacuumizing and closing system employing a conveyor and hood assembly for forming a vacuum chamber with a secondary vacuumizer inside the vacuum chamber.

A further object of the present invention is to provide a vacuumizing and closing system wherein a hood member includes as a part thereof means for sealing vacuumized bags.

Another object of the present invention is to provide a highly efficient vacuumizing system which lends itself to economical manufacture.

SUMMARY OF THE INVENTION

These and other objects of the present invention are desirably satisfied by an apparatus which includes: a first vacuum means for applying a vacuum to the exterior of a container and a second vacuum means for evacuating the container interiorly. In preferred aspects the invention includes: (1) a conveyor for transporting bagged products into and out of a vacuumizing zone, (2) a hood member which is actuated to contact the conveyor in the region of the vacuumizing zone and to form a vacuum chamber therewith, (3) an extractor communicable with the interior of the bag inside the vacuum chamber and foreclosing in communication of the interior of the bag directly with the vacuum chamber, (4) a bag closing means associated with the hood member, and (5) a vacuum source.

In operation, bagged products such as meat cuts, or fowl, are placed on the conveyor which transports the products to the vacuumizing zone. The vacuumizing zone is the region of the machine where vacuumizing occurs and when the product reaches this point, the conveyor is stopped and the hood member is brought into contact with the conveyor so that the hood and conveyor form a vacuum chamber around the product. Air is withdrawn from the chamber to create a vacuum around the bagged product. An extractor withdraws the air from the interior of the bag while the bag is in the chamber.

After a certain level of pressure reduction has been reached in the bag, a closing means associated with the hood member is made to seal off the bag's open end and thereby preserve the vacuum level within the bag. Subsequent to sealing, the air pressure within the chamber is returned to normal atmospheric, the hood member is removed from the vicinity of the conveyor, and the conveyor transports the now vacuumized and closed bag away from the vacuumizing zone, while at the same time transporting an unprocessed bag into the vacuumizing zone for the next vacuumizing cycle.

Although the particular devices employed may be varied and still fall within the scope of the present invention, one especially useful apparatus embodiment has been discovered and is preferred. In this embodiment an endless belt conveyor of rubber or other like material is used to transport the products into and out of the vacuumizing and sealing zone. The belt extends approximately the length of the apparatus and is powered by conventional means. The hood is mounted above the conveyor on pneumatic cylinders so that in its up position it is located out of the path of conveyed products and so that in its down position it contacts the conveyor to enclose the products located thereon and to form a vacuum chamber therewith. In this preferred embodiment, chamber vacuum is obtained through opening means in the conveyor belt. The conveyor's stop position is timed so that these vacuum opening means in the conveyor are adjacent a vacuum manifold positioned thereunder and connected with a conventional vacuum pump.

Bag locating means are also included as a part of the conveyor belt. These locating means position the bag with respect to the belt so that when the belt is stopped, the bag will lie properly to be engaged by the bag closing means. The bag closing means, which is included in the hood member and engages the bag's neck opening during the downward travel of the hood assembly, closes the bag after it has been vacuumized.

In this preferred embodiment, the sequencing of events is largely and advantageously determined by the conditions of the events themselves. First, the position of the product with respect to the vacuumizing zone indirectly signals the belt to stop and the hood to be lowered. Then, the hood being positioned with the belt to form a vacuum chamber causes vacuumizing to begin. When a satisfactory chamber vacuum is obtained sensing means cause the interior of the bag to be evacuated. When a satisfactory bag vacuum is obtained, relay means cause the bag closure device to operate. Subsequently, the obtaining of proper air pressure in the air-operated, bag closing means, signals both the disengagement of the clipper closure means and the cessation of chamber vacuumization. When the chamber returns to normal atmospheric pressure, the hood member is made to rise. Finally, the upward motion of the hood triggers control means to start the conveyor and begin a new vacuumizing cycle.

This method of sequencing insures that the desired results of each event take place before the succeeding event occurs. It allows for variables, e.g.: in vacuum level and air pressure, and is thought to be superior to prior art control means which rely on timers and like means.

Additional aspects and further features of the present invention are included in the following brief description of the drawings and discussion of the preferred embodiments.

DISCUSSION OF THE PREFERRED EMBODIMENTS

General discussion of the preferred and alternative embodiments

Figure 1:
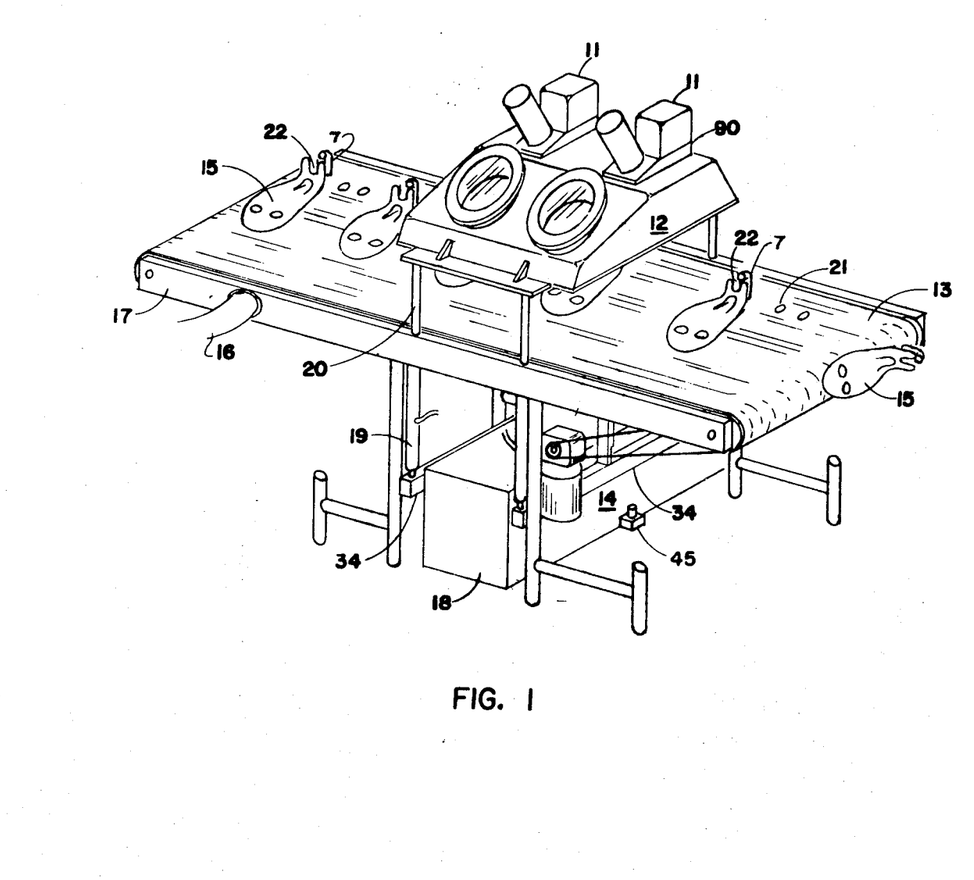
FIG. 1 is an isometric view of the vacuumizing and closing apparatus.

In FIG. 1 we have shown a perspective view of one embodiment of the vacuumizing and closing apparatus. The major components of the apparatus include the bag-closing clipper assemblies 11, the hood member 12, the conveyor belt 13, the conveyor belt drive assembly 14, the product locators 15, the extractors 7, the extractor clamping means 8, the connecting means 16 leading to an appropriate vacuum source (not shown), the apparatus support and frame assembly 17, control box 18, pneumatic cylinders 19, and hood supporting piston rods 20.

In operation these components relate to one another and function in the following manner:

Still referring to FIG. 1, bagged products are placed on the locating members 15 which are at the upstream side of the machine, or in this figure, at the far end of the machine. The bags are situated so that their open ends lie in the U-shaped slot 22 of the locators 15 and are received over the end of the extractor for clamping by the extractor clamping means 8 therearound. The bagged products are transported by conveyor 13 (to which locators 15 are attached by bolts or other means), to the vacuumizing and sealing zone comprising in this case the projection of hood 12 onto conveyor belt 13.

When two bagged products and their locators are positioned beneath the hood 12, the conveyor stops. At this time, air cylinders 19, through their associated hood support piston rods 20, lower the hood 12 until it contacts the conveyor and encloses the bagged products in the chamber thus formed. Atfer the chamber configuration is obtained, air from within the chamber is evacuated through conveyor openings 21, vacuum manifold 37 (FIG. 2), and vacuum connector line 16. At the same time a limited amount of air is evacuated from the bag 56 through the extractor 7, conveyor opening 150, the upper region of manifold 151 and bleed line 152 which is connected to manifold 37. When a sufficient vacuum level is reached in the chamber 39, valve 153 is closed and valve 154 is opened completing the evacuation of the bag 56. Valve 155 is a one-way ball valve and closes automatically when the vacuum on line or conduit 152 is switched to manifold 151. When a sufficient vacuum level is reached in the bag 56 clipper 11 crimps a clip around the open bag neck to seal off and preserve the vacuum level inside the bag. When the bag has been sealed, air cylinders 19 raise the hood 12, and the conveyor is started again. The vacuumized and closed bags are carried out of the vacuum sealing zone where they may be removed from the locators and be borne away for further processing.

Certain variations may be made in the components of the vacuumizing and closing apparatus as described and shown and still fall within the generally preferred embodiment of the present invention. For instance, it is not necessary to employ a single vacuumizing zone. Longer conveyors may be provided with two or a plurality of vacuumizing and sealing zones. Nor is it necessary that two bagged products be vacuumized during each vacuumizing and sealing cycle. One or any additional number of products within practical limits may be located in the vacuum chamber and be vacuumized and closed with each cycle. Furthermore, although preferred, it is not necessary in some instances to employ mechanical bag closing devices of the type shown and to be more fully described in the following. For instance, the bag's open end may be closed by heat sealing means.

Additional variations in alternative examples may be made in the manner of vacuumizing and in the configuration of the product locators. Although it has been found particularly advantageous to employ the vacuumizing method shown, it is also possible to apply a vacuum to the chamber through the hood assembly, rather than through the conveyor belt.

Figure 2:
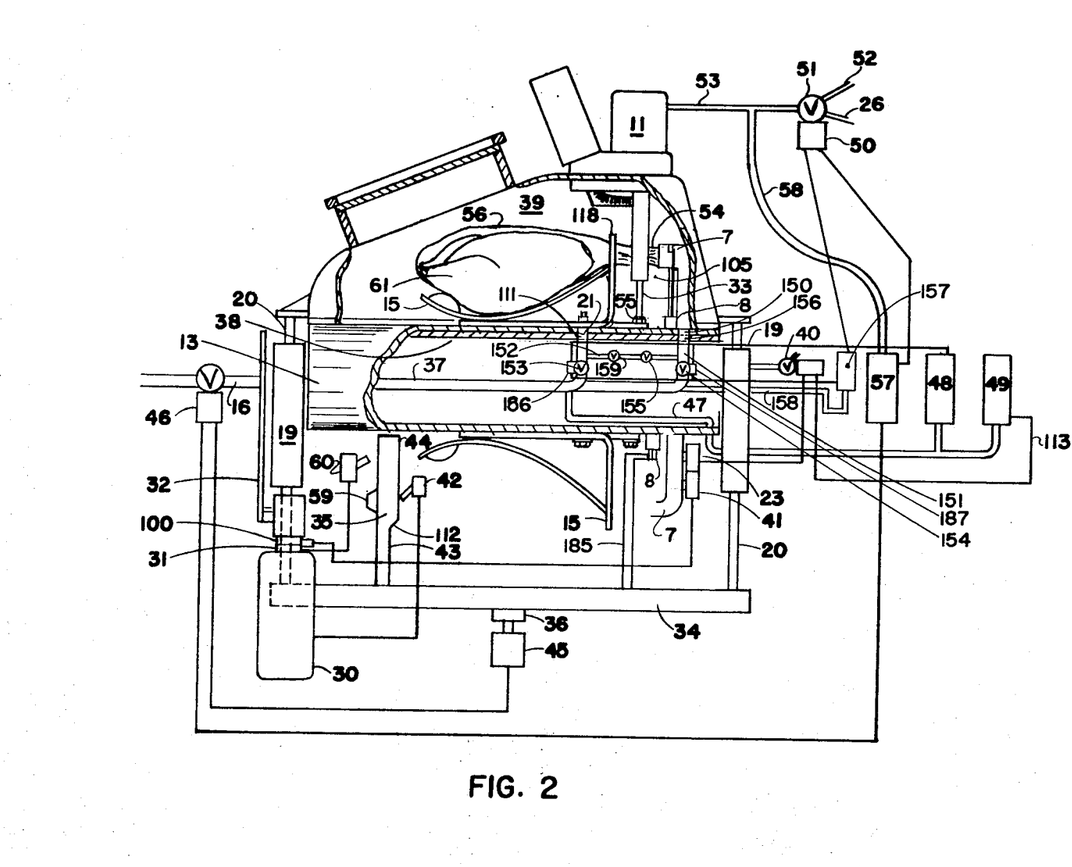
FIG. 2 is a partial cut away elevation view and a schematic representation of the major elements of the vacuumizing and closing apparatus with the cylinders 19 and rods 20 foreshortened.
Figure 8:
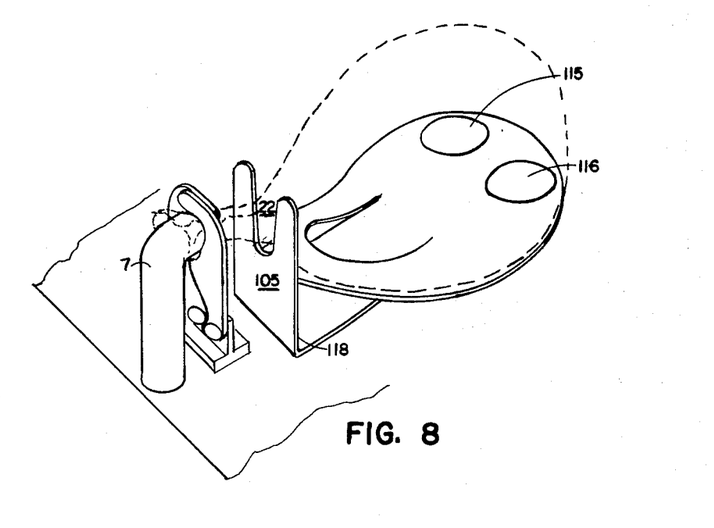
FIG. 8 is an isometric view of a product locator and the extractor pipe.

The configuration of the product locators may be varied to suit the requirements of the particular object to be vacuum packaged. The locators 15, shown in FIGS. 1, 2 and 8 are useful for bagged fowl, particularly turkeys. Other types of locators may be advantageously employed for other types of products. Certain products require no locators other than positioning marks on the conveyor belt.

In certain instances it may be desirable to vary the manner of actuating the hood member 12. Although raising and lowering in a vertical manner by pneumatic cylinders is preferred, the hood may also be raised and lowered by mechanical linkages, lever arms or the like. It is also possible to bring the hood into contact with the conveyor by mounting the hood on pivotable supports so that it engages the conveyor by a swinging action.

Having described now the more general aspects of the present invention, the discussion is directed to operable details of the preferred apparatus as shown and described. This detailed discussion includes description of the components necesary for sequencing the various events in vacuumizing and sealing packages; description of the mechanical clipping device, and description of a clip feed mechanism.

Sequencing of events and sequencing apparatus

Referring now to FIG. 2, we have shown the preferred mechanical, electrical, and pneumatic apparatus for obtaining the proper event sequences in vacuum packaging and closing bagged products. Also reviewed are the apparatus elements to be sequenced as generally described in the preceding discussion.

The overall apparatus includes endless belt 13, belt drive motor 30, and drive motor clutch 31 and brake 100. Also included are chain drive member 32, hood member 12 (FIG. 1), clipper assembly 11, and clipper actuating rod 33. Product locators 15 are employed and are attached in pairs around the belt 13 so that when the belt is stopped (by means to be subsequently discussed), a pair of locators 15 will lie in the sealing zone.

Additional elements are the hood actuation pneumatic cylinders 19, the support piston rods 20, and the piston tie bars 34, (FIG. 1). These tie bars increase the rigidity of the hood actuating mechanism and provide a mounting means for drive mechanism actuating rod 35, and vacuum means actuating block 36.

Other apparatus includes the vacuum line 16 which extends into the interior of the apparatus and joins the vacuum manifold 37. The manifold communicates with the vacuum chamber 39 through opening means 111 in the reinforcing plate 38 (which is attached to the frame 17 FIG. 1), and conveyor opening means 21.

Also included are the extractor 7 and its clamping means 8 and vacuum manifold 151 which opens to the extractor 9 through opening means 156 in the reinforcing plate 38 and conveyor opening means 150. One-way valve 155 is in the bleed line 152. The extractor means 7 is an upstanding cylindrical conduit or evacuator tube attached to and incorporated as a part of the conveying means 13. The conduit has a terminal end projecting parallel to the conveying means.

The further apparatus actuators, valves, switches etc. which comprise the remainder of FIG. 2 will be described more completely in the following. These additional components are shown somewhat schematically for simplicity; in actual devices they are primarily located in control box 18 (FIG. 1). And although the aforementioned and subsequently discussed components have proved particularly advantageous, it should be noted that other combinations and types of devices may be substituted to achieve the requisite functions.

As previously indicated the major events to be sequenced are: 1. lowering the hood, 2. stopping the conveyor, 3. applying vacuum to the vacuum chamber, 4. evacuating the bag, 5. clip sealing the bag's open end, 6. venting the chamber to atmospheric pressure, 7. raising the hood, and 8. restarting the conveyor. Sequencing is accomplished by employing sensing, signaling, and actuating means wherein the condition of a preceding event controls the progression to a subsequent event.

After initially starting the conveyor (which is accomplished by conventional solenoid and switch means), the first action of the vacuumizing and closing cycle is to lower the hood. This takes place when the arm of switch 23 strikes the extractor tube 7 as the tube passes underneath the belt in the embodiment shown.

Switch 23 is electrically connected to valve actuator 9 which, upon being energized, opens valve 40. Valve 40 controls the pressure line to pneumatic cylinders 19 and, by being opened to atmosphere, allows hood member 12 to fall under the influence of gravity. Due to the damping action of air trapped within the cylinders 19, the hood drops slowly, rather than abruptly into the path of the product locators.

During this time the belt has continued to move and has caused the extractor tube 7 to contact switch 41 for the second event. Switch 41 is connected to the clutch 31 and the brake mechanism 100 of belt drive motor 30 and, upon being activated, causes the motor clutch to be disengaged and the brake to be applied. This in turn causes the conveyor belt to stop.

Switch 41 is shown beneath switch 23 for clarity's sake. It should be noted that in actual practice it is located to the rear of switch 23 so that the extractor tube 7 contacts, first, switch 23, and then 41. Furthermore, it should be noted that switch 41 is positioned with respect to the extractor tube 7 of the equidistantly spaced locator pairs and with respect to the vacuumizing zone so that it stops the conveyor at the correct time or position for: (1) lining up the vacuum openings in the belt and reinforcing plate, (2) positioning the locators in the vacuumizing zones, and (3) aligning the locators properly with the hood borne, clipping units.

The hood member completes the major portion of its descent after the belt is stopped to avoid interference with the product locators. Proceeding downwardly with the hood is the tie bar 34, to which is attached the motor actuating rod 35 and the vacuum actuating block 36, FIGS. 1 and 2.

Actuating rod 35 has an inset surface 43 and a raised surface 44. The actuating arm of switch 42 lies in this inset portion 43 when the hood and, hence, the block are in their up position. However, as block 36 descends, the actuating arm of switch 42 is raised onto surface 44 by switch cam element 112, thereby activating switch 42. The switch 42 is connected to the power input of drive motor 30 and upon being activated turns off the power to motor 30. This is a safety measure to prevent possible conveyor travel while the hood member is down.

At the bottom travel of the aforesaid components, the vacuum actuator block 36 strikes switch 45 for the third major event. The switch is connected to vacuum valve actuator 46 which opens line 16 to the vacuum source (not shown). Air is then evacuated from chamber 39.

Tubing line 47 leads from vacuum manifold 37 to pressure sensitive switches 48 and 49. When a predetermined vacuum level commensurate with satisfactory vacuumizing has been reached in chamber 39 and, hence, manifold 37, pressure sensitive switch 48 is activated for the fourth major event, or bag evacuation. Valve 153 is closed and valve 154 is opened through valve actuators 186 and 187, respectively. This shuts the vacuum off to chamber 39 and opens full vacuum through manifold 151 to the vacuum extractor 7. Valve 155 is a one-way ball valve and is closed by the vacuum. When a predetermined vacuum level commensurate with satisfactory vacuumizing has been reached in bag 56 and, hence, extractor 7 and manifold 151 this pressure is sensed through conduit 158 and pressure sensitive switch 157 is activated for the fifth major event, or bag closing. Valve 51 is opened to high pressure air line 52, through electrically connected valve actuator 50, and high pressure air between 40 and 80 p.s.i. is delivered from valve 51 through line 53 to the clipper assembly 11. The clipper assembly has been previously moved downward into the vicinity of the bag neck 54 by the downward movement of hood 12.

Figure 3:
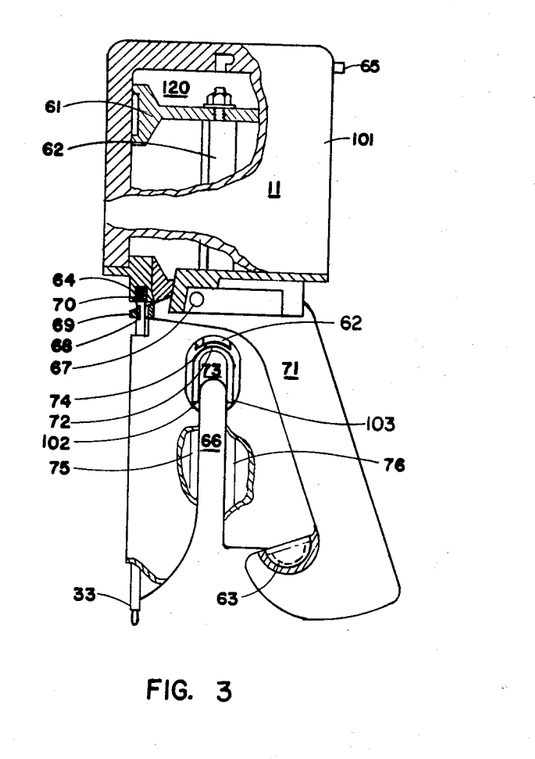
FIG. 3 is a partial cut away elevation view of a clipper closing means.

In one closure embodiment the clipper's engaging jaw is closed around the bag neck as the jaw actuating rod 33 (FIG. 3) is brought into contact with product locator engaging means 55 (FIG. 8). However in other embodiments the engaging jaws are closed by the action of an air cylinder mechanically connected thereto. In either of the above or other alternative cases, after the jaw is closed, high pressure air, as indicated, is introduced into clipper piston chamber 120 (FIG. 3). Then, certain components of the assembly (to be discussed subsequently) are activated so that a clip is delivered around the bag's neck 54 and crimped to close off the bag's neck and thereby preserve the vacuum which has been created within bag 56.

The application of high pressure air to the piston chamber of clipper 11 is continued until the bag has been satisfactorily closed and a pre-determined pressure level (for instance 60 p.s.i.) reached in the clipper piston chamber. The pressure sensitive switch 57 registers this pressure level, through air line 58, and signals actuator 50 to close the high pressure feed air line 52 and open the vacuum line 26. The vacuum application returns the clipper piston and other components to their normal, out-of-operating condition.

Pressure sensitive switch 57 is also connected with the main vacuumizing chamber vacuum line actuator 46. After the predetermined pressure level has been created in clipper 11, switch 57 signals actuator 46 for the sixth major event. The valve associated with actuator 46 is closed to vacuum and opens line 16 so that the vacuum chamber 39 is vented to atmosphere.

When the chamber and hence the manifold 37 and line 16 have reached atmospheric pressure level, pressure sensitive switch 49, through connecting line 47, signals actuator 9 to open valve 40 to high pressure air for the next event. In this action, cylinders 19 cause piston support rods 20 to ascend and to thereby raise the hood member 12.

As the hood is being raised, switch 45 is reset and switch 42 is returned to its normal engaging position with respect to inset face 43, thereby returning power to the belt drive motor 30. The final event in the cycle occurs as the actuator bar 35 continues its upward travel, when, at the proper height to allow the hood to clear the locators 15, striker 59 engages switch 60. This action disengages the clutch 31, and engages the conveyor drive brake 100, thus causing the conveyor to resume its normal travel. The now bagged and vacuumized product 61 is delivered out of the vacuumizing zone.

After vacuumizing, the product may be subjected to conventional processing such as heat shrinking the bi-axially oriented polymeric film often employed as bag material. The products may be lifted off the conveyor by hand and transported to subsequent processing stations. However, considerable benefit is realized when the bags are allowed to drop off the end of the conveyor onto another conveyor leading to a heat shrink, or other operation. The product locators 15 (FIG. 8) are particularly suited for this since the open U-shaped slots 22 (FIG. 8) allow the product to fall easily off the locator when it is inverted at the end of the conveyor.

Clipping device

Referring now to FIG. 3 we have shown the clipper assembly 11 in partial cut away view. The major components of the clipper assembly include piston housing 101, piston member 61, piston chamber 120, piston rod and clip drive, punch means 62, clip crimping anvil means 63, and clipper actuating rod 33. Other components include air entry port 65, bag neck enclosing space 66, pivot pin 67, recess 64, driving rod notched portion 68, and the gripping jaw swing arm connector 69. In operation these elements cooperate to crimp closed a clip around a bag's open neck.

Figure 7:
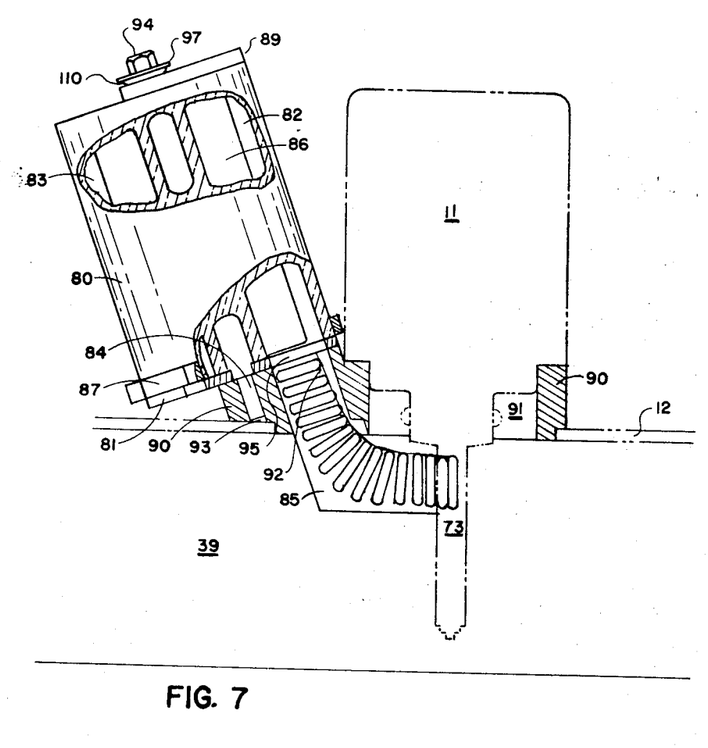
FIG. 7 is a partial elevation view of a cylindrical clip feed member.

First, the entire clipping apparatus is carried downwardly with the hood member, to which it is attached by an adaptor means 90 (FIG. 7). As the clipper proceeds downwardly, it engages or straddles the bag neck in the throat space 66, which is sufficiently large to facilitate proper air evacuation from the bag through the bag's neck.

The bag's neck is held in position to be so engaged by the U-shaped slots 22 located in the two vertical end pieces of the product locator and holding means 15 as as seen in FIG. 8. Two crown members 115 and 116 at the rear of the locator also aid in positioning the product. The clipper straddles the bag's neck in the area 105 between the vertical end piece 118 which is further depicted in FIG. 2 and the extractor 7. Thus it may be seen that the product locator 15 is incorporated with the conveying surface and spaced from but adjacent to the extractor 7.

When the hood and hence the clipper has reached its bottom travel, gripping jaw actuator 33 strikes engaging surface 55 on locator 15 as seen in FIGS. 2 and 8, and is driven upwardly against spring 70 in the space 64. As jaw actuator 33 is being driven upwardly, it causes jaw member 71 to rotate about pivot point 67. The vertical path of actuator 33 is translated into the swinging motion of the jaw member by notch 68 being engaged by mechanical linkage 69. Anvil 63 is a part of the jaw 71 and is also swung around so that it lies directly beneath and thereby encloses space 66 in which the bag neck is located.

Figure 9:
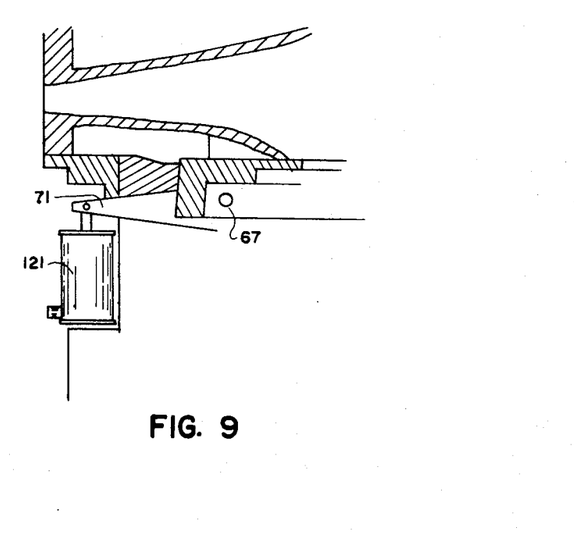
FIG. 9 is a partial, cut away view of an air operated gate assembly.

There is also another method of actuating gate or jaw member 71. In this method (as seen in FIG. 9), the actuating rod 33 is replaced by an air cylinder 121. The air cylinder is connected to the gate 71 so that when the cylinder is activated, it rotates the gate about pivot means 67. The air cylinder is preferably activated prior to high pressure air being introduced into port 65 (FIG. 3). It should also be noted that in certain cases other means may be employed to actuate a gate in enclosing space 66.

Preferably subsequent to gate closing, high pressure air is introduced into the port 65 by the valve means 51 as described and discussed with reference to FIG. 2. When this occurs, the piston 61, and associated piston rod, and clip drive 62 are forced downwardly. The clip engaging end 74 of clip drive rod 62 carries an individual clip 72 from space 73 downwardly along the track formed by grooves 75 and 76 and around the bag neck located in space 66. Grooves 75 and 76 are located within the body of the frame surrounding space 66 so that the legs 102 and 103 of the clip will not slip out of the carrying track and so that they will not pinch and become entangled with the bag's neck material.

Figure 4:
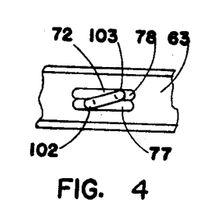
FIG. 4 shows in plan view a closure clip engaged with the anvil member of the clipping device shown in FIG. 3.
Figure 5:
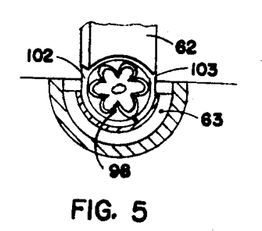
FIG. 5 is an elevation view of the closure clip of FIG. 4.

Clip drive 62 forces the clip and the bag's neck to proceed downwardly through space 66 into subsequent engagement with the anvil member 63 which defines in its closed position the bottom portion of space 66. The respective ends 102 and 103 of the clips are engaged into the crimping slots or grooves of the anvil member as seen in FIGS. 3, 4 and 5. As the punch proceeds downwardly, the clip ends are cammed toward one another and bent into a tight loop about the bag's neck 98 (FIG. 5). Since each clip leg engages separate anvil grooves it is necessary that the clip be angled with respect to the grooves. The punch drive 62 and guide slots 75, and 67 may be angled to the anvil as in the example shown in FIGS. 3, 4 and 5, or the anvil grooves themselves may be angled with the punch and guide slots remaining straight.

During the clip engaging and crimping period, high pressure air has been applied through port 60 against the upper surface of piston 61. When a predetermined pressure level has been reached, and adequate clip crimping achieved, pressure sensitive switch 57, seen in FIG. 2, actuates valve 51 so that the application of high pressure air to port 65 is terminated and a vacuum is applied instead through port 65. Thereafter piston 61 is lifted into the region of lower pressure air and hence disengages from contact with the now closed clip. Drive member 62 is raised sufficiently high so that the next clip from the clip supply will drop in the space 63 and thereby be available for the next vacuumizing and closing cycle. The bag neck is freed from space 66 when the hood and hence the clipper is raised. Actuator 33 is also removed from contact with engaging means 55 (seen in FIG. 2), and is forced downwardly by spring 70, moving the jaw 71 and associated anvil 63 away from the bag's neck. When an air cylinder gate actuator is employed, the cylinder is caused to open the gate after clipping takes place.

Clip feed and supply apparatus

Figure 6:
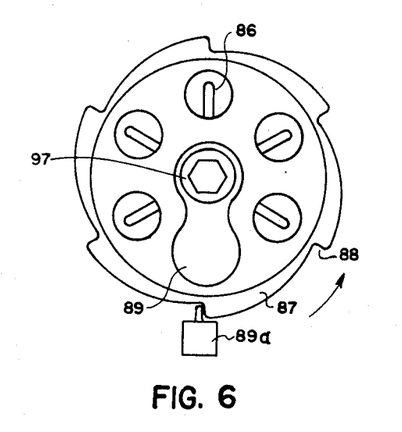
FIG. 6 is a plan view of a cylindrical clip feed member

Referring now to FIGS. 6 and 7, we have shown the clip feed and supply apparatus. The apparatus comprises basically a clip supply cylinder with storage chambers and a clip feed track leading into communication with clip feed space 73 of clipper 11, as seen in FIG. 3.

In FIG. 7 cylinder 80 is shown attached to plate 81. The cylinder is revealed in cut away view to show clip supply chambers 82 and 83. Cylinder 80 is manually rotatable about shaft 84 so that the clip supply chambers can be moved into position over clip feed track 85. Clips are mounted on guide members such as guide member 86 in chamber 82.

A stop ring 87 is provided so that the clip guides lie in correct alignment with the clip feed track 85. This stop ring 87 is also shown in FIG. 6 and includes notched sections 88. These notched sections lie in radial array around stop ring 87 and with respect to the clip supply chambers, in such a manner that spring loaded stop 89 can provide a fixed registration point for correct guide alignment with the clip feed track 85.

Both clipper 11, and clip supply cylinder 80 are mounted by bolts, screws or other convenient means to adaptor 90 as seen in FIG. 7, and seen in isometric view in FIG. 1. Opening 91 is provided in adaptor 90 for receipt of the lower portion of clipper assembly 11. Opening 92 is provided for receipt of the upper portion of clip feed track 85, and opening 93 is provided for journaled receipt of the lower end of shaft 84. Plate 81 has a corresponding opening through which shaft 84 passes and has an additional opening 95 through which the clips may pass.

All of the clip supply chambers are normally uncovered except for the chamber which is in communication with opening 92 and aligned over feed track 85. This chamber is covered at its upper end by member 89 which is biased toward the cylinder's top by a resilient O-ring 110 which is pressed thereagainst by bolt 94 and washer 97. Member 89 is pressed sufficiently tight against the cylinder's top to preserve vacuum in the subject chamber and in main vacuum chamber 39. However, it is not pressed thereagainst so tightly that slidable movement is rendered difficult when the cylinder is rotated to align a new chamber with the clip feed track 85.

Whenever the level of clips is below plate 81, it is necessary to rotate the cylinder so that a chamber containing a complete supply of clips is positioned over the clip feed tracks 85 and opening 95. In order to be able to conveniently note when the clip supply is low, it has been found advantageous to construct the cylinder 80 from clear plastic material. Cast acrylic type of plastic has been employed, however, other types of plastic including polycarbonate or polystyrene may also be used.

The clips employed in the clipping device are of conventional type and manufacture. They may vary in size for different applications, and the clipper and clip supply apparatus may likewise be varied accordingly. Such clips are usually taped together 92 (FIG. 7), along their closed ends so that a clip located in space 73, as seen in FIG. 3, will be held in that location by the tape itself and by the following clip to which it is taped. It will only travel downwardly when engaged by the drive member 62 (FIG. 3) and thereby separated from the following clip in the row of clips. The taped clip supply is flexible so that it will slide down gravity feed track 85 and present a new clip in space 73 after the previous clip has been severed from the taped-together clip supply.

The clipper, and other components of the vacuumizing and closing device may be varied and still fall within the scope of the present invention which is only to be limited by the following claims.

Extractor clamping means

The extractor clamping means 8 includes two pivoted clamping arms 160 and 161 which have respective semicircular or arcuate portions or clamping regions 162 and 163 that generally conform to the outer shape of the extractor 7 and mate therewith. Neoprene rubber shoes 154 and 165 are mounted on respective ones of the clamping regions 162 and 163 and the clamping dimension is such that when a bag is engaged on the extractor 7 and clamped thereagainst by the clamping means an air tight seal is formed.

The pivoted arm 160 is directly connected to a handle 166. As may be seen in FIG. 10 the shaft 167 of pivoted arm 160 has gear teeth 170 directly meshed with gear teeth 171 of shaft 168 of arm 161. Thus, the rotation of arm 160 directly rotates arm 161 in the opposite direction. A spring 172 (FIG. 11) is mounted on shaft 167 and compressed between housing wall 173 and a pin 174 on the opposite shaft 168 to bias arm 161 to its open position and thereby also biases arm 160 to its open position via gears 170 and 171. Thus to clamp a bag in gas tight position against the outer end of extractor 7 the two arms pivot toward each other and the terminal end of the extractor 7.

Figure 10:
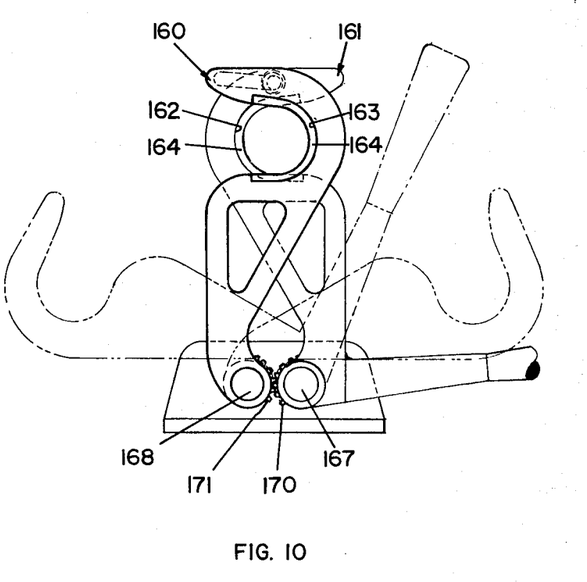
FIG. 10 shows a front view of the extractor clamping means.
Figure 11:
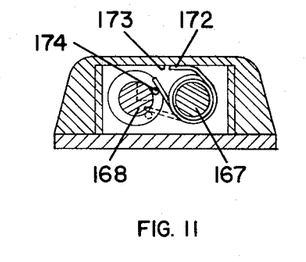
FIG. 11 is a cross section showing the spring means mounted on a shaft of said clamping means.
Figure 12:
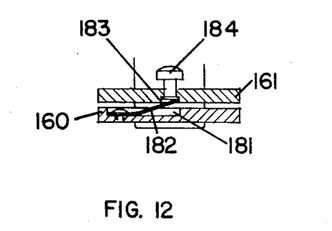
FIG. 12 shows the catch means located in an arm of said clamping means.

The arms 160 and 161 are maintained in their closed position by a catch means 180 FIGS. 10 and 12. Catch means 180 is provided at the upper end of the arms where they overlap when closed. The catch means 180 includes an offset slot 181 in arm 160 in which a leaf spring member 182 is mounted and offset slot or catch 183 in arm 161. The leaf spring 182 is biased toward arm 161 and extends at an angle from its slot 181 so that upon closing it slides over the inner surface of arm 161 and snaps into catch 183 when the arms are tightly pressing the bag against the extractor 9. The impingement of the end of the leaf spring 182 against the walls of the catch prevents the opening of the arms 160 and 161. To release the arms plunger release member 184 is pressed inwardly against the catch end of the leaf spring 172 forcing it out of the catch 183. The arms are then opened by the spring 172. Plunger release member 184 is pressed by its engagement with arm 185 (FIG. 2) which is attached to tie bar 34 and projects forward to release the bag just as the locator is turned substantially upside down by the conveyor means 13.

A valve 188 is provided in line 152 for manual adjustment to regulate the rate of bleed through the manifold 151 from the bag 56 during the vacuumizing of the chamber 39 through the manifold 37.

A variation which is contemplated for use in the preferred embodiment is sensing the vacuum pressures for sensors 48 and 157 in the surge tank of the vacuum source (not shown). This would indicate when the full vacuum has been pulled. Also it is generally preferable to equip the clipper with a cutter for severing the neck of the bag adjacent the closed clip. When this is done sensor 57 also activates the cutter at the same time it signals actuator 46 for the sixth major event.

Operation

Turning now to the operation of our packaging procedure and by way of example to the preferred embodiment of our invention in packaging poultry products such as cleaned and dressed hens, a loading operator would sequentially remove individual bagged birds from a supply and place the bags with the birds therein individually onto a product locating means 15 (FIGS. 1, 2 and 8). Each bag, which is inflatable and flexible walled, is positioned in its locator with the bottom of its outer closed end portion engaged between and against two spaced apart projecting crown members 115 and 116 as shown in FIG. 8. The forward open end of the bag where it encompasses the neck end of the bird is retained cradled in the cut out cradle portion of the locator where it slopes upwardly as shown in FIG. 8. The bag's open neck passes through the vertical end piece 118 which is spaced from the extractor 7 for receipt of the clipper jaw portions therebetween. The bag's neck passes through slot 22 in the end piece 118 and is retained and positioned thereby. The open end of the bag is received on the terminal end of the conduit extractor 7 where it opens above conveyor 13 in general alignment with slots 22. Clamping means 8 engage the open end of the bag and clamp it in air tight engagement to the extractor means. This brings the extractor 7 into communication with the interior of the bag. As shown the product locators and extractors are arranged in pairs and thus two locators would be loaded in succession. In this way the bag with a product or article therein is placed on a conveying means.

In the preferred form of practicing this invention with the preferred embodiment, once power is supplied to the apparatus the apparatus will cycle continuously as hereinafter described. The loaded pair of locators are thereby brought under hood 12. The pair of loaded product locators is stopped in position under the hood 12 in the area where the vacuumizing of the product occurs by a companion evacuator 7 engaging the switch 23 under the conveyor 13 signaling the actuating means 9 to stop the conveying means and lower the hood member onto the conveying means. In this way the conveyor is stopped in response to the bag thereon reaching a predetermined location and the hood means is then automatically brought into contact with the conveyor means to form a vacuum chamber therebetween and enclose the product.

As the hood 12 lowers onto the conveyor 13 the open throat space 66 (FIG. 3) of each of the open ended clippers 11 straddles a respective bag neck where the bag neck passes between the U-shaped slot 22 of the product locator and the extractor 7. As the hood reaches its lower position actuator 33 (FIG. 2) strikes engaging surface 55 on a respective locator 15 and is driven upwardly against spring 70 rotating the jaw member 71 about picot point 67 positioning the clipper anvil 63 in line for the receipt of a clip for closing the neck of the bag at a later time. The open space 66 and the slot 22 are of such dimension that ample space remains for the air in the bag to escape therefrom. At the same time the cooperation of the extractor, clipper throat and the slot serves to retain and confine the neck of the bag during its subsequent inflation during evacuation.

When the hood member contacts the conveying means to form a vacuum chamber or confined zone therewith its position is sensed and actuating means are signaled to initiate the evacuation of air from manifold 37 and through opening 21 from chamber 39. This is accomplished by engagement of the vacuum actuator block 36 with the switch 45 opening lines 16 through vacuum valve actuator 46.

As the chamber is evacuated the bag inflates because its outside walls are initially subjected to a vacuum greater than any interior vacuum applied interiorly. This effect is very important in the substantially complete evacuation of the bag because this prevents the normal drawing down of the neck of the bag onto the neck end of the bird preventing air trapped further down in the bag from escaping from the bag. To prevent the bag from inflating to such an extent as to burst valve 155 in bleed line 152 is opened by the vacuum in the manifold 37 and bleeds air from the bag 56 through extractor 7 and the upper region of manifold 151. The rate and amount of the bleed off is pre-adjusted by valve 159. The air or gas in the bag inflates the bag and helps to bring about its own escape. In this way the chamber 39 is vacuumized and the bag therein is brought to a first vacuum level which is generally not as complete an evacuation as of the chamber itself.

The vacuum level within the chamber is brought to a level previously determined, and by way of Example 25 inches of mercury vacuum, by partial evacuation of the air from the confined zone and from the container over a period of for example 3 seconds to produce the desired degree of vacuumization of chamber and inflation and partial vacuumizing within the bag. Valve 53 is then closed and valve 154 opened in response to a predetermined level of air evacuation from the chamber to initiate independent evacuation of air from the bag. Actuating means are signaled by a means sensing the level of vacuum to initiate the independent vacuumizing of the bag via the extractor to a second higher vacuum level through its connection to the second vacuumizing means through opened valve 154 and while the entire bag is maintained in the vacuum chamber. This is done through pressure sensitive switch 48 sensing the vacuum level in the vacuum chamber 39 through manifold 37 and signaling actuating means 186 to stop the vacuumizing of the chamber and signaling actuating means 187 to begin the independent evacuation of the bag. The vacuumizing of manifold 155 closes valve 159.

The vacuum level within the bag is brought to a level previously determined, and by way of example 25 inches of mercury vacuum, by partial evacuation of the air from the bag through extractor 7 and over a period of for example 3 seconds to produce the desired degree of vacuumization within the bag. The bag is then closed in response to a predetermined level of air evacuation from the chamber. Actuating means are signaled by a means sensing the level of vacuum to actuate the bag closure means to close the neck of the bag. This is done through pressure sensitive switch 157 sensing the vacuum level in the manifold 155 which actuates valve 51 to its open position to high pressure air line 52. These elements are responsive to the air pressure in the bag independent of the pressure in the vacuum chamber.

A clip is closed around each of the bag necks to preserve the vacuum level thus created in the bag. The clip is closed by a punch means engaging the closed end of the clip, delivering the clip downwardly in its track, around the bag neck located in space 66 and forcing the legs of the clip into bending contact with the anvil means 63 to crimp the clip and mechanically close off the bag neck.

Next a sensing is made that the closure means has satisfactorily closed each bag by detecting that a predetermined pressure level has been reached in each clipper piston chamber 120 and pressure sensitive switch 57 is activated signalling actuator 50 to close the high pressure air line 52 and open the vacuum line 26 returning the clipper piston and other components to their retracted positions releasing the hold exerted thereby on the now clipped neck of the bag. It will be understood that both clipper chambers 120 are directly connected to line 53 although for purposes of illustration only one chamber connection is shown. Pressure sensitive switch 57 also signals actuators 186 and 187 reversing valves 153 and 154 and signals actuator 46 which opens or vents the vacuum chamber 39 to atmosphere. In this way the chamber is vented to atmospheric pressure responsive to the bag being closed.

Next a sensing is made that the vacuum chamber has reached atmospheric pressure and actuating means are signalled to actuate the movement of the hood member from contact with the conveying means. When the chamber and manifold 37 reach atmospheric pressure, this is sensed by pressure sensitive switch 49 through connecting line 47. Pressure sensitive switch 49 signals actuator 9 to open valve 40 to high pressure air to raise the hood. In this way the hood member is raised in response to atmospheric pressure being attained in the chamber. In respective clippers, spring 70 opens the gate 71 and the clipper throat clears the closed neck of the bag as the hood rises.

Next a sensing is made when the position of the hood member is such that its parts are clear of the bagged products and their locators. Actuating means are then signalled to actuate the conveying means to start. Switch 45 is reset, and switch 42 is activated to power the belt drive motor 30 as the hood rises and when the hood has raised sufficiently to clear the locators striker 59 engages switch 60 which disengages clutch 31 and conveyor brake 100 causing the conveyor to resume its normal travel transporting the bag container from the confined zone. In this way the conveyor means is started responsive to the hood member being raised transporting the closed bags away from the area where vacuumizing occurs.

The conveyor carries the extractor 7 past switch 23 and this switch is then reset for the next cycle. The switches 23 and 41 are only switched by every other engagement, thus the other extractor 7 of the pair does not change the circuit of the switches as it passes them. Alternatively a striker could be placed on every other extractor so that only every other extractor will engage the switch. When the hood reaches its fully up position with the pistons fully extended it is held in this position by the pressure in the cylinders.

During the time the vacuumizing and closing cycle is being carried out automatically the operator sequentially loads the next pair of product locators with two bagged birds as previously described. As the vacuumized and closed bags pass around and under the conveyor 13 a striker 185 engages the plunger 184 and cams it inwardly unlatching or releasing the clamping means 8. This is done sequentially for each pair of clamping means 8. The two now packaged birds are removed from the conveyor by tumbling off of the product locators as they pass under the conveyor. The timing of this action is less critical if the neck of the bag was severed between the clipper and extractor immediatedly after clipping as previously mentioned as a possible variation. Of course the clamping means 8 may be manually released and the packaged birds removed by being lifted off the conveyor by another operator. When the pair of freshly loaded product locators passes into position under the hood 12 the cycle is ready for its repetition.

It may be seen in summary that through our procedure the neck of the bag is confined and the initial escape of air from the bag is at least somewhat restricted so that the chamber reaches a more complete evacuation level during the initial vacuum phase than the bag. If the pressure in the bag will not increase to such a degree as to risk bursting the bag the first phase may involve no vacuumizing of the interior of the bag. The pressure on the outside of the bag is reduced and the bag which contains gas, usually air, is inflated. The gas in the bag that caused the inflation is finally separately withdrawn until the quantity withdrawn permits the bag to be returned to at least substantially its initial dimensions and usually until the flexible walls of the bag are drawn against the article by the second vacuumizing. The bag is then mechanically closed to maintain the reduction in the internal gas. Generally this is done with the reduced pressure substantially maintained in the chamber and hence on the outside of the bag. After closing the reduced pressure is removed from outside the bag even further constricting the dimensions of the bag.

When an extractor is not used there is a tendency for some gas to be left in pockets about the product in the bag. This problem is worse if a bag's neck draws down on the product before substantially all of the gas has been withdrawn from the bag. This can even leave the bag partially ballooned at its outer end. Even if this only occurs on occasional bags to some extent it reduces the package quality which in the case of meats can cause deterioration in random packages depending on the variation in level of evacuation achieved.

In addition, because the final evacuation is applied selectively to the inside of the bag, the amount of vacuum needed in the chamber for satisfactory vacuum has been observed to be reduced. Consistant package quality has been obtained despite variations in product size, shape and nature, pouch size and the pouch product size relationship. In general, the use of this system will allow variable sized products requiring consistent vacuum packaging such as cuts of fresh beef to be vacuumized in one-half the time period with one-half the vacuum pump capacity which would be required if the extractor vacuum principle of this invention was not used.

Figure 13:
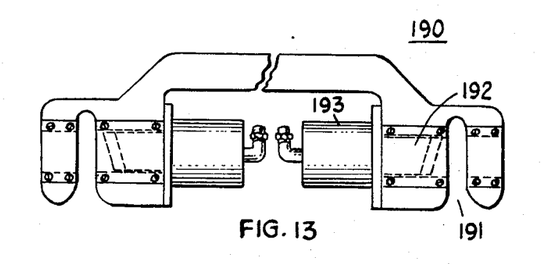
FIG. 13 shows a severing means for severing the neck of a bag when held between said clamp and said extractor.

FIG. 13 shows a suitable severing means 190 which may be attached to the hood 12 between the two clippers 11 and suspended between the clipper and the extractor 7. Thus after the neck of the bag has been sealed by a clip the bag may be severed between the clip and the extractor. It may be seen looking at FIG. 13 that the severing means 190 has a throat 191 for receiving the neck of the bag as the hood is lowered into contact with the belt 13. A blade 192 is positioned in a channel and passes across the throat 191 into a channel on the opposite side for severing the neck of the bag. The blade is driven by an air piston in piston cylinder 193. The piston can desirably be spring retracted or air retracted. The piston may be activated to sever the neck of the bag by the pressure sensitive switch 57 which senses the proper closure of the clip. The piston may desirably be retracted either because it is a pulse drive arrangement or in response to the pressure sensitive switch 49 detecting that the chamber 37 has reached atmospheric pressure. As shown in FIG. 13 the severing means is equipped with equivalent parts for severing the neck of the second bag being processed at the same time in the preferred embodiment.

While in accordance with the patent statutes, we have described what at present is considered to be the preferred embodiments of our invention, it will be obvious to those skilled in the art that numerous changes and modifications may be made therein without departing from the invention and it is therefore aimed in the appended claims to cover all such equivalent variations as fall within the true spirit and scope of the invention.

We claim:

1. An apparatus for vacuumizing containers comprising:
   (a) a vacuum chamber wherein said container is positionable,
   (b) means for at least partially evacuating gas from said chamber,
   (c) an extractor means communicable with the interior of said container in said chamber for at least partially separately evacuating the interior of said container, and
   (d) a one-way bleed means connecting said vacuum chamber with said extractor means during evacuation of said vacuum chamber but closing in response to the separate evacuation of said extractor.

2. An apparatus according to claim 1 wherein said container is an open ended flexible walled bag and including:
   (i) sensing, signalling, and actuating means for sequencing the events occurring in evacuating said chamber and at least partially separately evacuating the interior of said container, wherein the condition of a preceding event controls the progression to a subsequent event;
   (ii) a cover means and a surface member wherein said cover means contacts said surface member to form said vacuum chamber therewith; and,
   (iii) said extractor means is an upstanding cylindrical conduit attached to said conveying means, said conduit having a terminal end projecting parallel to said conveying means, said apparatus including a clamping means, said terminal end of said conduit received in the open end of said bag, said clamping means including two pivoted arms, each of said arms having a respective arcuate portion mating with said cylindrical conduit at its outer end and pivoting toward the other respective arm and said terminal end of said conduit with the open end of the bag thereon to clamp said bag thereon in gas tight position.

3. An apparatus for at least partially evacuating the air from open ended bags wherein products are located comprising:
   (a) a conveying surface for transporting said bags and products therein,
   (b) a hood member adapted for engagement with said conveying surface to form a vacuum chamber therewith,
   (c) means for at least partially evacuating air from said chamber,
   (d) means engaging the open end of said bags in air tight engagement in said chamber,
   (e) means for at least partially evacuating air from said bag separately from evacuating air from said chamber, and
   (f) sensing, signalling, and actuating means for sequencing the events occurring in at least partially evacuating the air from said chamber and from said bags wherein products are located, wherein the sensing of a predetermined condition of a preceding event signals actuating means to actuate a subsequent event.

4. An apparatus according to claim 3 including a mechanical bag closing means incorporated in said hood member and comprising elements for straddling the neck of said bag with a clip means and elements for closing said clip about a bag neck.

5. An apparatus according to claim 4 including at least two product locating means incorporated with said conveying surface.

6. An apparatus for vacuumizing and closing open ended bags wherein products are located, comprising:
   (a) a conveying surface for transporting said bagged product, (b) a hood member adapted for engagement with said conveying surface to form therewith a vacuum chamber, (c) a vacuumizing means communicable with said vacuum chamber, (d) an extractor means, said extractor means including a conduit incorporated with said conveying means and having a terminal end opening above said conveying means, (e) clamping means for clamping the open end of the bag to said extractor means, (f) at least one product locating and holding means incorporated with said conveying surface and spaced from but adjacent to said extractor means, and (g) an air-operated, mechanical closing means incorporated in said hood member and including elements for straddling the neck of said bag with a clip means between said extractor means and said product locating means and elements for closing said clip about said bag neck.

7. An apparatus according to claim 6 including sensing, signalling and actuating means for sequencing the events occurring in vacuumizing and closing a bag wherein elements are included that sense the air pressure in said air-operated mechanical closing means; elements that signal said air-pressure condition to actuating members, said members at a predetermined air pressure level causing said closing means to disengage with said bag neck and causing said chamber to return to normal atmospheric pressure; elements at least indirectly responsive to the position of said products; elements responsive to the position of said hood member; elements responsive to the air pressure in said vacuum chamber and elements responsive to the air pressure in said bag independent of the air pressure in said vacuum chamber.

8. An apparatus according to claim 6 including a frame member and a reinforcing member attached thereto wherein:

in (a) said conveying surface comprises an intermittently moveable endless belt mounted in said frame member, said reinforcing member being positioned beneath at least a portion of said conveying surface, and said conveying surface including opening means communicable with said vacuum source, in (b) said hood member is disposed above said endless belt and is reciprocably engageable therewith, in (f) said product locating means include product support elements adapted for supporting and positioning said bag during the conveying, vacuumizing, and closing thereof, and in (g) said closing means includes a throat member sufficiently large to straddle the neck of said bag whereby said bag remains open for the vacuumizing of said product, a punch means for delivering an open ended clip around said bag neck and anvil means against which said punch means drives said clip to close the necks of said bag, and said apparatus including sensing, signalling, and actuating means for sequencing the events occurring in vacuumizing and closing bags including:

(1a) elements for at least indirectly sensing the position of said product, and signalling means responsive to the position of said product for signalling actuating means to actuate the lowering of said hood member onto said belt, and signalling means responsive to the position of said product for signalling actuating means to actuate the stopping of said belt, (1b) elements for sensing the position of said hood member, and signalling means responsive to the position of said hood member for signalling actuating means to actuate the vacuumizing of said chamber, (1c) elements for sensing the vacuum level in said chamber, and signalling means responsive to the vacuum level in said chamber for signalling actuating means to stop the vacuumizing of said chamber and initiate the separate vacuumizing of said bag via said extractor, (1d) elements for sensing the vacuum level in said bag, and signalling means responsive to the vacuum level in said bag for signalling actuating means to actuate the closing off of the neck of said bag, (1e) elements for sensing the air pressure in said vacuum chamber, and signalling means responsive to the air pressure in said vacuum chamber that signal actuating means to actuate the raising of said hood member, and (1f) elements for sensing the position of said hood member, and signalling means responsive to the position of said hood member that signal actuating means to actuate the starting of said belt.

9. A method for vacuumizing bags wherein the outside of the bag is subjected to a vacuum in a vacuum chamber and the interior of the bag is evacuated through an evacuator tube while the bag is in the chamber, the steps of the method comprising:

(a) clamping the mouth of said bag about said evacuator tube, (b) forming said vacuum chamber about said bag responsive to said bag being located at a predetermined position, (c) at least partially evacuating the air from said chamber responsive to said chamber being closed, (d) at least partially independently evacuating air from said bag responsive to a predetermined level of air evacuation from said chamber, (e) closing said bag responsive to a predetermined level of air evacuation from said bag, (f) venting said chamber to atmospheric pressure responsive to said bag being closed, (g) opening said chamber responsive to achieving atmospheric pressure in said chamber, (h) sequencing the events according to steps (a) through (g) above wherein the bag encloses a product and the apparatus includes a hood means, conveying means, product locating means incorporated with said conveying means, vacuum means, extractor means and mechanical closing means, the sequencing steps comprising:

(i) sensing the position of said product locators with respect to the area where the vacuumizing of said product occurs and signalling actuating means to actuate said conveying means to stop and said hood member to lower onto said conveying means, (ii) sensing the position of said hood member with respect to said conveying means and signalling actuating means to actuate vacuumization to begin when said hood member contacts said conveying means to form a vacuum chamber therewith, (iii) sensing the vacuum level in said vacuum chamber and signalling acuating means to stop the vacuumizing of said chamber and begin the independent evacuation of said bag, (iv) sensing the vacuum level in said bag and signalling actuating means to actuate said bag closure means to close the neck of said bag when a pre-selected vacuum level has been created in said bag, (v) sensing when said closure means has satisfactorily closed said bag and signalling actuating means to actuate the venting of said chamber to atmosphere, (vi) sensing when said vacuum chamber has reached atmospheric pressure and signalling actuating means to actuate the movement of said hood member from contact with said conveying means, and (vii) sensing the position of said hood member and signalling actuating means to actuate said conveying means to start.

References Cited

UNITED STATES PATENTS

| | | | |
|---|---|---|---|
| 3,238,696 | 3/1966 | Christensson | 53—112 BX |
| 2,850,856 | 9/1958 | Mosse | 53—89 |

FOREIGN PATENTS

| | | | |
|---|---|---|---|
| 1,103,837 | 3/1961 | Germany | 53—112 B |

TRAVIS S. McGEHEE, Primary Examiner

U.S. Cl. X.R.

53—84, 89, 112 B, 138 A